United States Patent
Yeo et al.

(10) Patent No.: US 12,445,232 B2
(45) Date of Patent: Oct. 14, 2025

(54) METHOD AND APPARATUS FOR TRANSMITTING AND RECEIVING DATA AND FEEDBACK IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Hyunseok Ryu, Gyeonggi-do (KR); Sungjin Park, Gyeonggi-do (KR); Jonghyun Bang, Gyeonggi-do (KR); Cheolkyu Shin, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/112,759

(22) Filed: Feb. 22, 2023

(65) Prior Publication Data

US 2023/0198687 A1    Jun. 22, 2023

Related U.S. Application Data

(63) Continuation of application No. 16/673,297, filed on Nov. 4, 2019, now abandoned.

(30) Foreign Application Priority Data

Nov. 2, 2018   (KR) .......................... 10-2018-0133896

(51) Int. Cl.
*H04L 1/1867*   (2023.01)
*H04L 1/00*   (2006.01)
(Continued)

(52) U.S. Cl.
CPC .......... *H04L 1/1887* (2013.01); *H04L 1/0057* (2013.01); *H04L 1/1685* (2013.01);
(Continued)

(58) Field of Classification Search
CPC ... H04L 1/1887; H04L 1/0057; H04L 1/1812; H04L 1/1874; H04L 1/1835;
(Continued)

(56) References Cited

U.S. PATENT DOCUMENTS

| | | | |
|---|---|---|---|
| 10,305,637 | B2 | 5/2019 | Kim et al. |
| 10,630,428 | B2 | 4/2020 | Bergström et al. |

(Continued)

FOREIGN PATENT DOCUMENTS

| | | |
|---|---|---|
| CN | 105846977 | 8/2016 |
| CN | 106301670 | 1/2017 |

(Continued)

OTHER PUBLICATIONS

Ericsson, "On Design of CBG HARQ-ACK Feedback Schemes", 3GPP TSG RAN WG1 Meeting#90, Agenda Item: 6.1.3.3.4.3, R1-1714438, Prague, Czech Republic, Aug. 21-25, 2017, Total pp. 6 (Year: 2017).*

(Continued)

*Primary Examiner* — Shah M Rahman
(74) *Attorney, Agent, or Firm* — The Farrell Law Firm, P.C.

(57) ABSTRACT

Methods and apparatuses are provided for performing communication in a wireless communication system is provided. A number of hybrid automatic repeat request (HARQ) processes is set as N. The N is a natural number, one value within a maximum value, 16, and set based on a configuration of a base station (BS). Downlink control information (DCI) is received including a 1-bit HARQ-acknowledgment (HARQ-ACK) feedback request for all of N HARQ processes. HARQ-ACK information associated with all of the N HARQ processes is identified, based on the received DCI. A number of bits for the HARQ-ACK information is defined based on xN by the configuration, and the x is a natural (Continued)

number. The HARQ-ACK information is transmitted to the BS.

16 Claims, 19 Drawing Sheets

(51) Int. Cl.
  *H04L 1/1607* (2023.01)
  *H04L 1/1812* (2023.01)
  *H04W 72/232* (2023.01)

(52) U.S. Cl.
  CPC .......... *H04L 1/1812* (2013.01); *H04L 1/1874* (2013.01); *H04W 72/232* (2023.01)

(58) Field of Classification Search
  CPC ... H04L 1/1614; H04L 1/1822; H04L 1/1854; H04L 1/1685; H04L 1/1864; H04L 1/0025; H04L 1/1861; H04L 5/0007; H04L 5/0094; H04W 72/23; H04W 72/21; H04W 72/232
  See application file for complete search history.

(56) References Cited

U.S. PATENT DOCUMENTS

| | | | |
|---|---|---|---|
| 10,903,943 | B2 | 1/2021 | Tabet et al. |
| 11,728,936 | B2 | 8/2023 | Fu et al. |
| 2009/0305698 | A1 | 12/2009 | Zhang |
| 2010/0322165 | A1 | 12/2010 | Yoo |
| 2015/0016353 | A1 | 1/2015 | Lee |
| 2016/0037524 | A1 | 2/2016 | Krzymien |
| 2016/0100422 | A1 | 4/2016 | Papasakellariou |
| 2016/0261379 | A1 | 9/2016 | Bergstrom et al. |
| 2017/0135080 | A1 | 5/2017 | Xia |
| 2017/0331670 | A1* | 11/2017 | Parkvall ............... H04L 41/0816 |
| 2017/0346605 | A1 | 11/2017 | Chendamarai et al. |
| 2018/0049176 | A1* | 2/2018 | Park ....................... H04L 5/0044 |
| 2018/0123767 | A1 | 5/2018 | Islam |
| 2018/0145796 | A1 | 5/2018 | Liang et al. |
| 2018/0294924 | A1 | 10/2018 | Jeon et al. |
| 2018/0302128 | A1 | 10/2018 | Akkarakaran |
| 2019/0059102 | A1 | 2/2019 | Yerramalli |
| 2019/0068332 | A1* | 2/2019 | Hehn ..................... H04L 1/1864 |
| 2019/0081763 | A1 | 3/2019 | Akkarakaran |
| 2019/0140804 | A1 | 5/2019 | Tang |
| 2019/0208518 | A1* | 7/2019 | Baldemair ............ H04L 1/1607 |
| 2019/0253200 | A1 | 8/2019 | Salem |
| 2019/0268930 | A1 | 8/2019 | Rudolf |
| 2019/0306923 | A1 | 10/2019 | Xiong |
| 2019/0327764 | A1* | 10/2019 | Yoo ........................... H04L 1/18 |
| 2019/0335431 | A1 | 10/2019 | Wang |
| 2019/0363857 | A1 | 11/2019 | Hwang |
| 2019/0386791 | A1 | 12/2019 | Wong |
| 2020/0044791 | A1 | 2/2020 | Tasi |
| 2020/0059327 | A1* | 2/2020 | Kini ...................... H04L 5/0055 |
| 2020/0068608 | A1 | 2/2020 | Ye |
| 2020/0186299 | A1 | 6/2020 | Lunttila |
| 2020/0204328 | A1* | 6/2020 | He ......................... H04L 5/0055 |
| 2020/0313802 | A1 | 10/2020 | Xu |
| 2020/0329490 | A1 | 10/2020 | Suzuki |
| 2020/0336262 | A1 | 10/2020 | Liu |
| 2020/0374045 | A1 | 11/2020 | Yin |
| 2020/0404692 | A1 | 12/2020 | Yin |
| 2020/0413428 | A1* | 12/2020 | Liu ......................... H04L 1/1819 |
| 2021/0105748 | A1 | 4/2021 | Chen |
| 2021/0250130 | A1* | 8/2021 | Lei ......................... H04L 1/1816 |
| 2021/0352704 | A1* | 11/2021 | Yang ..................... H04L 5/0053 |
| 2022/0045803 | A1 | 2/2022 | Lin |

FOREIGN PATENT DOCUMENTS

| | | | | |
|---|---|---|---|---|
| CN | 106471765 | | 3/2017 | |
| CN | 107078862 | | 8/2017 | |
| CN | 110034861 B | * | 6/2024 | .......... H04L 5/0007 |
| KR | 10-2017-0114911 | | 10/2017 | |
| KR | 20170114971 A | * | 10/2017 | |
| WO | WO 2018/014162 | | 1/2018 | |

OTHER PUBLICATIONS

International Search Report dated Feb. 13, 2020 issued in counterpart application No. PCT/KR2019/014691, 10 pages.
Tsai et al., "Enhanced HARQ-ACK Feedback Mechanisms", MediaTek, U.S. Appl. No. 62/753,117, filed Oct. 31, 2018, 12 pages.
LG Electronics, "Support of HARQ-ACK Mutliplexing/bundling for NR", R1-1713194, 3GPP TSG RAN WG1 Meeting #90, Aug. 21-25, 2017, 9 pages.
European Search Report dated Oct. 18, 2021 issued in counterpart application No. 19880694.5-1213, 9 pages.
European Search Report dated Mar. 25, 2022 issued in counterpart application No. 19880694.5-1205, 7 pages.
Indian Examination Report dated Feb. 17, 2023 issued in counterpart application No. 202137019823, 7 pages.
Chinese Office Action dated Oct. 8, 2023 issued in counterpart application No. 201980072474.8, 17 pages.
Korean Office Action dated Aug. 22, 2023 issued in counterpart application No. 10-2018-0133896, 6 pages.
Korean Office Action dated Feb. 26, 2024 issued In counterpart application No. 10-2018-0133896, 8 pages.
European Search Report dated May 6, 2024 issued in counterpart application No. 19880694.5-1206, 6 pages.
Indian Hearing Notice dated May 2, 2024 issued in counterpart application No. 202137019823, 2 pages.
Qualcomm Incorporated, "Enhancements to Scheduling and HARQ Operation for NR-U", R1-1811254, 3GPP TSG RAN WG1 Meeting #94bis, Oct. 6-12, 2018, 8 pages.
European Search Report dated Sep. 4, 2024 issued in counterpart application No. 19880694.5-1206, 8 pages.
Indian Hearing Notice dated Jul. 3, 2024 issued in counterpart application No. 202137019823, 3 pages.
KR Decision to Refuse dated Sep. 26, 2024 issued in counterpart application No. 10-2018-0133896, 6 pages.
Korean Office Action dated Jan. 11, 2025 issued in counterpart application No. 10-2018-0133896, 7 pages.

* cited by examiner

METHOD AND APPARATUS FOR TRANSMITTING AND RECEIVING DATA AND FEEDBACK IN WIRELESS COMMUNICATION SYSTEM

CROSS-REFERENCE TO RELATED APPLICATION(S)

This application is a Continuation application of U.S. patent application Ser. No. 16/673,297, filed in the U.S. Patent and Trademark Office on Nov. 4, 2019, which is based on and claims priority under 35 U.S.C. § 119 to Korean Patent Application No. 10-2018-0133896, filed on Nov. 2, 2018, in the Korean Intellectual Property Office, the disclosure of which is incorporated by reference herein in its entirety.

BACKGROUND

1. Field

The disclosure relates generally to a wireless communication system, and more particularly, to a method and apparatus for transmitting and receiving data and feedback in a wireless communication system.

2. Description of the Related Art

To meet the increasing demand for wireless data traffic due to the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. For higher data rates, the implementation of 5G communication systems on ultra-high frequency bands (mmWave), e.g., 60 GHz, is being considered. In 5G communication systems, beamforming technologies, massive multi-input multi-output (MIMO) technologies, full dimensional MIMO (FD-MIMO) technologies, array antenna technologies, analog beamforming technologies, and large-scale antenna technologies have been discussed to alleviate propagation path loss and increasing propagation distances in ultra-high frequency bands.

For system network improvement, in 5G communication systems, technologies such as evolved small cell, advanced small cell, cloud radio access network (RAN), ultra-dense network, device to device (D2D) communication, wireless backhaul, moving network, cooperative communication, coordinated multi-points (CoMPs), and interference cancellation have been developed. In a 5G system, advanced coding modulation (ACM) schemes including hybrid frequency-shift keying (FSK), frequency quadrature amplitude modulation (QAM) (FQAM), sliding window superposition coding (SWSC), and advanced access schemes (including filter bank multi carrier (FBMC), non-orthogonal multiple access (NOMA), and sparse code multiple access (SCMA)) have been developed.

The Internet is now evolving into the Internet of things (IoT), where distributed entities, such as objects, exchange and process information. The Internet of everything (IoE) has also emerged, which is a combination of IoT technology and big data processing technology by employing a connection with a cloud server. In order to implement the IoT, technological elements, such as sensing technology, wired/wireless communication and network infrastructure, service interface technology, and security technology, are required. In this regard, technologies such as sensor networks, machine to machine (M2M) communication, and machine-type communication (MTC), have recently been researched for connection between things. Such an IoT environment may provide intelligent Internet technology (IT) services that create new value to human life by collecting and analyzing data generated among connected things. IoT may be applied to a variety of fields including smart homes, smart buildings, smart cities, smart or connected cars, smart grids, health care, smart appliances, and advanced medical services, by converging and combining existing information technology and various industries.

Thus, various attempts have been made to apply 5G communication systems to IoT networks. For example, 5G communication, such as sensor networks, M2M, and MTC, has been implemented by schemes such as beamforming, MIMO, and array antenna. The application of cloud RAN as a big data processing technology may also be an example of the convergence of 5G technology and IoT technology.

As one of many techniques for satisfying the gradually increasing demand for large-volume communication, a scheme to provide multiple connections has been proposed. For example, a carrier aggregation (CA) scheme of an LTE system may provide multiple connections through multiple sub-carriers. Thus, a user may be provided with a service by using more resources. In addition, through an LTE system, various services such as broadcast services like multimedia broadcast multicast services (MBMS) may be provided.

SUMMARY

The present disclosure has been made to address the above-mentioned problems and disadvantages, and to provide at least the advantages described below.

According to an aspect of the present disclosure, a method for performing communication by a terminal in a wireless communication system is provided. A number of hybrid automatic repeat request (HARQ) processes is set as N. The N is a natural number, one value within a maximum value, 16, and set based on a configuration of a base station (BS). Downlink control information (DCI) is received including a 1-bit HARQ-acknowledgment (HARQ-ACK) feedback request for all of N HARQ processes. HARQ-ACK information associated with all of the N HARQ processes is identified, based on the received DCI. A number of bits for the HARQ-ACK information is defined based on xN by the configuration, and the x is a natural number. The HARQ-ACK information is transmitted to the BS.

According to another aspect of the present disclosure, a method for performing communication by a BS in a wireless communication system is provided. DCI, including a 1-bit HARQ-ACK feedback request for all of N HARQ processes, is transmitted to a terminal. HARQ-ACK information associated with all of the N HARQ processes is received from the terminal. The N is a natural number, one value within a maximum value, 16, and set based on a configuration of the BS. A number of bits for the HARQ-ACK information is defined based on xN by the configuration, and the x is a natural number.

According to another aspect of the present disclosure, a terminal is provided for performing communication in a wireless communication system. The terminal includes a transceiver and a processor. The processor is configured to set a number of HARQ processes as N. The N is a natural number, one value within a maximum value, 16, and set based on a configuration of a BS. The processor is also configured to receive, via the transceiver, DCI including a 1-bit HARQ-ACK feedback request for all of N HARQ processes. The processor is further configured to identify HARQ-ACK information associated with all of the N HARQ processes, based on the received DCI. A number of bits for the HARQ-ACK information is defined based on xN by the configuration, and the x is a natural number. Additionally, the processor is configured to transmit, via the transceiver, the AHRQ-AC information to the BS.

According to another aspect of the present disclosure, a BS is provided for performing communication in a wireless communication system. The BS includes a transceiver and a processor. The processor is configured to transit, via the transceiver, DCI including a 1-bit HARQ-ACK feedback request for all of N HARQ processes, to a terminal. The processor is also configured to receive, via the transceiver, HARQ-ACK information associated with all of the N number of HARQ processes from the terminal. The N is a natural number, one value within a maximum value, 16, and set based on a configuration of the BS. A number of bits for the HARQ-ACK information is defined based on xN by the configuration, and the x is a natural number.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
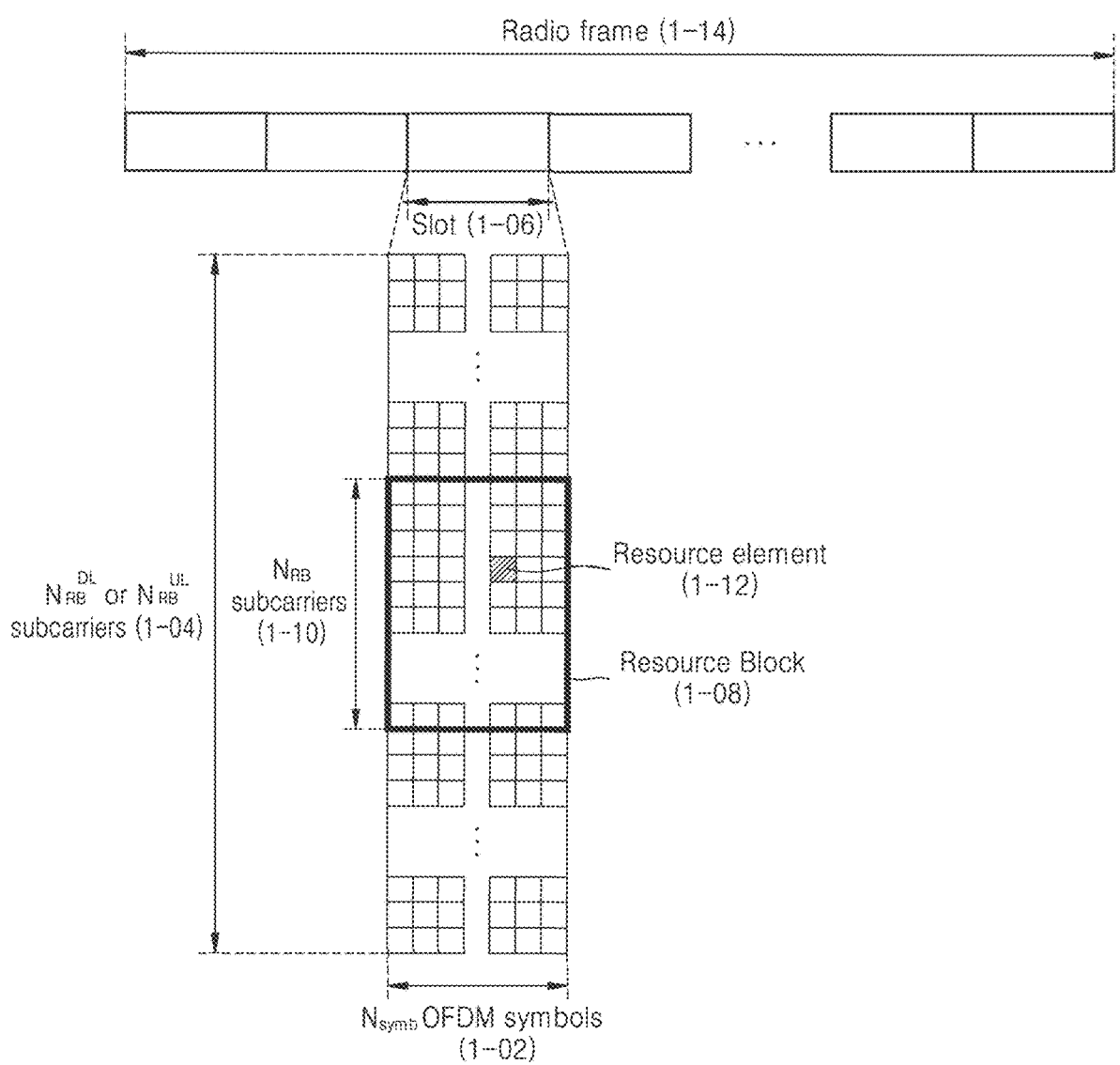
FIG. 1 illustrates a basic structure of a time-frequency domain that is a radio resource domain in which data or a control channel is transmitted in a downlink (DL) or an uplink (UL) in a new radio (NR) system, according to an embodiment.

The disclosure relates to a wireless communication system, and provides a method and apparatus for transmitting feedback within a limited time by enabling fast data processing when a UE receives data and transmits feedback.

New 5G communication, an NR access technology, has been designed to allow various services to be freely multiplexed in time and frequency resources, and thus waveform/numerology and a reference signal may be dynamically or freely allocated according to the need of a service. To provide an optimal service to a UE in wireless communication, optimized data transmission based on measurement of channel quality and interference quantity is needed, making accurate channel state measurement indispensable. However, unlike 4G communication in which channel and interference characteristics do not vary greatly with frequency resources, a 5G channel has channel and interference characteristics that change largely with a service, requiring a support for a subset at a frequency resource group (FRG) level to allow separate measurements. In the NR system, a type of a supportable service may be categorized into eMBB, mMTC, and URLLC. The eMBB may be regarded as high-speed transmission of high-volume data, mMTC may be regarded as minimization of power of the UE and accesses by multiple UEs, and URLLC may be regarded as a service aiming at high reliability and low latency. Depending on a type of a service applied to the UE, different requirements may be applied.

Along with the recent on-going research into next-generation communication systems, various schemes for scheduling communication with the UE have been discussed. Thus, there is a need for efficient scheduling and data transmission/reception schemes that consider characteristics of the next-generation communication systems.

As such, in a communication system, a plurality of services may be provided to a user. A method of providing each of the plurality of services in the same time period based on the characteristics and an apparatus capable of using the method may be required.

When the embodiments of the disclosure are described, technical matters that are well known in a technical field of the disclosure and are not directly related to the disclosure will not be described. By omitting unnecessary description, the subject matter of the disclosure can be more clearly described without being obscured.

Some elements described herein will be exaggerated, omitted, or simplified in the attached drawings. The size of each element does not entirely reflect the actual size of the element. In each drawing, an identical or corresponding element will be referred to as an identical reference numeral. A controller may also be referred to as a processor.

Throughout the specification, a layer (or a layer apparatus) may also be referred to as an entity. In other embodiments of the disclosure, the entity may be a hardware apparatus in the form of a chip.

Throughout the disclosure, the expression "at least one of a, b or c" indicates only a, only b, only c, both a and b, both a and c, both b and c, all of a, b, and c, or variations thereof.

Blocks of a flowchart and a combination of flowcharts may be represented and executed by computer program instructions. The computer program instructions may be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. The computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term "unit", as used herein, denotes a software or hardware component, such as a field programmable gate array (FPGA) or application specific integrated circuit (ASIC), which performs certain tasks. However, the meaning of "unit" is not limited to software or hardware. "Unit" may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, components and "units" may be implemented to execute one or more computer processing units (CPUs) in a device or a secure multimedia card. In the embodiments of the disclosure, a "unit" may include one or more processors.

A wireless communication system has evolved from an initial one that provides a voice-oriented service to a broadband wireless communication system that provides a high-speed and high-quality packet data service, such as 3GPP high speed packet access (HSPA), LTE or evolved universal terrestrial radio access (E-UTRA), LTE-Advanced (LTE-A or E-UTRA Evolution), 3GPP2 high rate packet data (HRPD), ultra mobile broadband (UMB), and the Institute of Electrical and Electronics Engineers (IEEE) 802.16e. As a 5G wireless communication system, 5G or NR communication standards have been established.

A 5G or NR system as a representative example of a broadband wireless communication system adopts orthogonal frequency division multiplexing (OFDM) in a DL and a UL. More specifically, cyclic-prefix (CP) OFDM is adopted in a DL, and discrete Fourier transform spreading (DFT-S) OFDM and CP-OFDM are adopted in a UL. The UL is a radio link through which a UE transmits data or a control signal to a BS (i.e., a gNodeB), and the DL is a radio link through which the BS transmits data or a control signal to the UE. The above-described multiple access scheme separates data or control information for each user by allocating and operating time-frequency resources on which the data or the control information is carried for each user, so that the time-frequency resources do not overlap each other, that is, so that orthogonality is realized.

The 5G or NR system employs a HARQ scheme that retransmits data in a physical layer when decryption fails in initial transmission of the data. HARQ refers to a scheme in which when a receiver fails to accurately decrypt (decode) data, the receiver transmits information indicating a decoding failure, i.e., a negative acknowledgement (NACK), to a transmitter to allow the transmitter to retransmit the data in the physical layer. The receiver improves data reception performance by combining the data retransmitted by the transmitter with data that fails to be decoded previously. When accurately decoding the data, the receiver transmits information indicating a decoding success, i.e., an ACK, to the transmitter to allow the transmitter to transmit new data.

FIG. 1 illustrates a basic structure of a time-frequency domain that is a radio resource domain in which data or a control channel is transmitted in a +DL or a UL in an NR system, according to an embodiment.

In FIG. 1, a horizontal axis represents a time domain and a vertical axis represents a frequency domain. A minimum transmission unit in the time domain may be an OFDM symbol, in which $N_{symb}$ OFDM symbols 1-02 may be gathered to constitute one slot 1-06. The length of the subframe may be defined as 1.0 millisecond (ms), and the length of a radio frame 1-14 may be defined as 10 ms. A minimum transmission unit in the frequency domain may be a subcarrier, and the transmission bandwidth of the whole system may include $N_{RB}^{DL}$ or $N_{RB}^{UL}$ subcarriers 1-04 in total.

In the time-frequency domain, a basic unit of a resource may be a resource element (RE) 1-12, and may be indicated as an OFDM symbol index and a subcarrier index. A resource block (RB) 1-08 or a physical resource block (PRB) may be defined as $N_{symb}$ successive OFDM symbols 1-02 in the time domain or $N_{RB}$ successive subcarriers 1-10 in the frequency domain. Accordingly, one RB 1-08 may be composed of $N_{symb} \times N_{RB}$ REs 1-12. In general, a minimum transmission unit of data may be the RB unit. In the NR system, generally, $N_{symb}=14$, $N_{RB}=12$, and $N_{BW}$ and $N_{RB}$ may be proportional to a bandwidth of a system transmission band. The data rate may be increased in proportion to the number of RBs scheduled for the UE.

In the NR system, for a frequency division duplexing (FDD) system in which the DL and the UL are discriminated by frequencies and operated, the DL transmission bandwidth and the UL transmission bandwidth may differ from each other. The channel bandwidth indicates an RF bandwidth that corresponds to a system transmission bandwidth. Table 1 indicates a corresponding relationship between the system transmission bandwidth defined in the LTE system that is 4G wireless communication prior to the NR system, and the channel bandwidth. For example, the LTE system having a channel bandwidth of 10 megahertz (MHz) may have a transmission bandwidth composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The NR system may support a bandwidth that is broader than the channel bandwidth of LTE provided in Table 1.

In the NR system, scheduling information regarding DL data or UL data may be delivered from the BS to the UE through downlink control information (DCI). The DCI may be defined according to various formats. That is, the DCI may be scheduling information (UL grant) regarding UL data, scheduling information (DL grant) regarding DL data, or compact DCI having small-size control information. Additionally, the DCI may apply spatial multiplexing using multiple antennas, and may be power control. For example, DCI format 1-1, which is scheduling control information (DL grant) regarding DL data, may include at least one of the following pieces of control information:

Carrier Indicator: indicates a frequency carrier in which a signal is transmitted;

DCI Format Indicator: indicates whether a DCI is for a DL or a UL;

Bandwidth Part (BWP) Indicator: indicates a BWP in which a signal is transmitted;

Frequency Domain Resource Assignment: indicates an RB of a frequency domain allocated for data transmission. A resource to be expressed may be determined based on a system bandwidth and a resource assignment scheme;

Time Domain Resource Assignment: indicates an OFDM symbol of a slot in which a data-related channel is to be transmitted;

VRB-to-PRB Mapping: indicates a scheme for mapping a virtual RB (VRB) index with a physical RB (PRB) index;

Modulation and Coding Scheme (MCS): indicates a modulation scheme and a coding rate used for data transmission. That is, this may indicate information about whether a modulation scheme is quadrature phase shift keying (QPSK), 16 QAM, 64QAM, or 256QAM, and a coding rate value indicating a transport block size (TBS) and channel coding information;

Code block Group (CBG) transmission information: indicates information about a CBG to be transmitted when CBG retransmission is set;

HARQ Process Number: indicates a process number of HARQ;

New Data Indicator: indicates whether transmission is HARQ initial transmission or retransmission;

Redundancy version: indicates a redundancy version of HARQ; and

Transmit Power Control (TPC) command for Physical Uplink Control Channel (PUCCH): indicates a TPC command for a PUCCH that is a UL control channel.

For the aforementioned PUSCH transmission, time domain resource assignment may be delivered through information regarding a slot in which the PUSCH is to be transmitted. A start symbol position S may be included in the slot, and a symbol number L may represent the number of symbols to which the PUSCH is mapped. In the aforementioned descriptions, S may be a relative position from the start of the slot, L may be the number of consecutive OFDM symbols, and S and L may be determined from a start and length indicator value (SLIV) defined as Equation (1) below.

$$\begin{aligned} &\text{if } (L - 1) \le 7 \text{ then} \\ &\quad SLIV - 14 \cdot (L - 1) + S \\ &\text{else} \\ &\quad SLIV = 14 \cdot (14 - L + 1) + (14 - 1 - S) \\ &\text{where } 0 < L \le 14 - S \end{aligned} \quad \ldots(1)$$

In the NR system, for the UE, a table including an SLIV value, a PUSCH mapping type, and information about a slot in which a PUSCH is to be transmitted in one row may be generally configured through RRC configuration. In the following time domain resource assignment of the DCI, by indicating an index value of the above-described configured table, the BS may deliver an SLIV value, a PUSCH mapping type, and information about a slot in which a PUSCH is to be transmitted to the UE.

In the NR system, the PUSCH mapping type may be defined as a type A and a type B. In the PUSCH mapping type A, a first symbol among demodulation reference signal (DMRS) symbols may be located in a second or third OFDM symbol of the slot. In the PUSCH mapping type B, the first symbol among the DMRS symbols may be located in a first OFDM symbol of a time domain resource assigned for PUSCH transmission.

The DCI may be transmitted on a physical downlink control channel (PDCCH or control information, hereinafter used interchangeably) through channel coding and modulation.

Generally, the DCI may be scrambled with a particular radio network temporary identifier (RNTI) or a terminal identifier, independently for each terminal, and a CRC is added to the DCI which is then channel-coded and independently configured as a PDCCH for transmission. The PDCCH may be transmitted after the PDCCH is mapped in a control resource set CORESET configured in the UE.

The DL data may be transmitted on a PDSCH that is a physical channel for DL data transmission. The PDSCH may be transmitted after a control channel transmission period, and scheduling information such as a detailed mapping position and a modulation scheme in the frequency domain may be determined based on the DCI transmitted through the PDCCH.

Using the MCS among the control information of the DCI, the BS may notify the UE of a modulation scheme applied to the PDSCH to be transmitted and a size of data to be transmitted (a transport block size (TBS)). The MCS may be composed of a predetermined number of bits (i.e., 5 bits or more/less). The TBS may correspond to the size before a channel coding for error correction is applied to the data, that is, a transport block (TB), which the BS intends to transmit.

The TB may include a medium access control (MAC) header, a MAC CE, one or more MAC service data units (SDUs), and padding bits. The TB may indicate the unit of data transmitted down to the physical layer from the MAC layer, or a MAC protocol data unit (PDU).

A modulation scheme supported in the NR system may be QPSK, 16QAM, 64QAM, and 256QAM, and respective modulation orders Qm may correspond to 2, 4, 6, and 8. For QPSK modulation, 2 bits per symbol may be transmitted, and for 16QAM, 4 bits per symbol may be transmitted. Further, 6 bits per symbol may be transmitted for 64QAM, and 8 bits per symbol may be transmitted for 256QAM.

Figure 2:
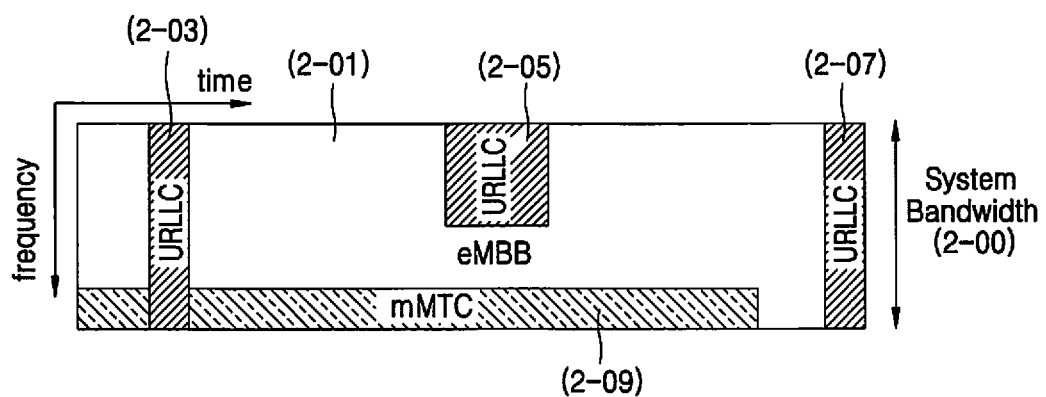
FIG. 2 illustrates a state where data for services considered in a $5^{th}$-generation (5G) or NR system, such as enhanced mobile broadband (eMBB), ultra-reliable and low-latency communications (URLLC), or massive machine type communications (mMTC), is assigned in frequency-time resources, according to an embodiment.
Figure 3:
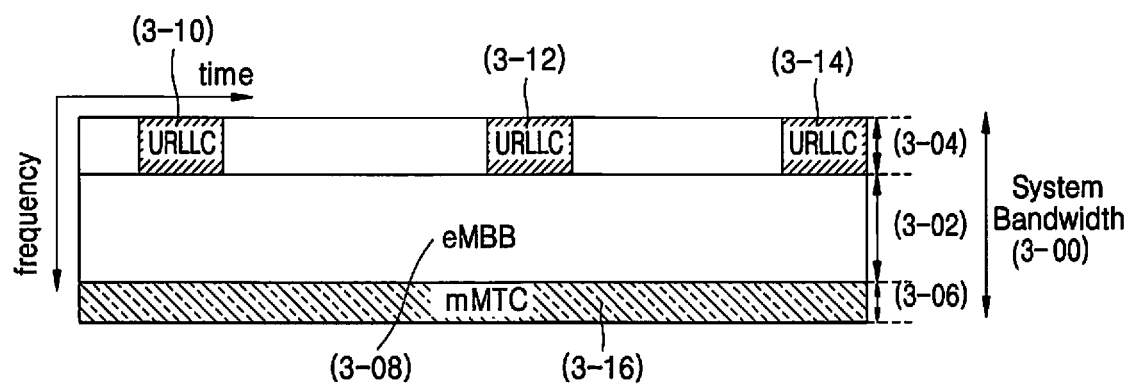
FIG. 3 illustrates a state where data for services considered in a 5G or NR system, such as eMBB, URLLC, or mMTC, is assigned in frequency-time resources, according to an embodiment.

FIG. 2 illustrates a state where data for services considered in a 5G or NR system, such as eMBB, URLLC, and mMTC, is assigned in frequency-time resources, according to an embodiment. FIG. 3 also illustrates a state where data for services considered in a 5G or NR system, such as eMBB, URLLC, and mMTC, is assigned in frequency-time resources, according to an embodiment.

Referring to FIGS. 2 and 3, a scheme may be seen in which frequency and time resources are assigned for information transmission in each system.

In FIG. 2, data for eMBB, URLLC, and mMTC is assigned in a total system frequency band 2-00. When URLLC data 2-03, 2-05, and 2-07 are generated and need to be transmitted during assignment and transmission of eMBB data 2-01 and mMTC data 2-09 in a particular frequency band, parts with which the eMBB data 2-01 and the mMTC data 2-09 are already assigned may be emptied or transmission may not occur, such that the URLLC data 2-03, 2-05, and 2-07 may be transmitted. The URLLC data 2-03, 2-05, and 2-07 may be assigned to a part of a resource assigned with the eMBB data 2-01 and transmitted because a delay time of the URLLC data among the aforementioned services needs to be reduced. When the URLLC data is additionally assigned to the eMBB-assigned resource and transmitted, eMBB data may not be transmitted in the redundant frequency-time resources, such that transmission performance for the eMBB data may be degraded. That is, in this case, an eMBB data transmission failure due to the URLLC assignment may occur.

In FIG. 3, a total system frequency band 3-00 may be divided into sub-bands 3-02, 3-04, and 3-06. A service and data may be transmitted in each divided sub-band 3-02, 3-04, and 3-06. Sub-band configuration-related information may be previously determined, and the sub-band configuration-related information may be transmitted from a BS to a UE through high-layer signaling.

Sub-band-related information may be arbitrarily divided by the BS or a network node, such that services may be provided to the UE without separate transmission of sub-band configuration-related information to the UE. FIG. 3 shows a state in which a sub-band 3-02 is used for transmission of eMBB data 3-08, a sub-band 3-04 is used for transmission of URLLC data 3-10, 3-12, and 3-14, and a sub-band 3-06 is used for transmission of mMTC data 3-16.

A length of a transmission time interval (TTI) used for transmission may be shorter than a length of a TTI used for eMBB mMTC transmission. A response to information related to URLLC may be transmitted faster than a case with eMBB or mMTC, such that for URLLC, information may be transmitted and received with low latency.

A structure of a physical channel used for each type to transmit the foregoing three types of services or data may differ. For example, at least one of a length of a TTI, an assignment unit of a frequency resource, a structure of a control channel, or a mapping method of data may be different.

While three types of services and data have been described above, more types of services and corresponding data may exist, and the disclosure is applicable to more types of services and corresponding data.

The present disclosure may be applied to a wireless communication system rather than the NR system.

Figure 4:
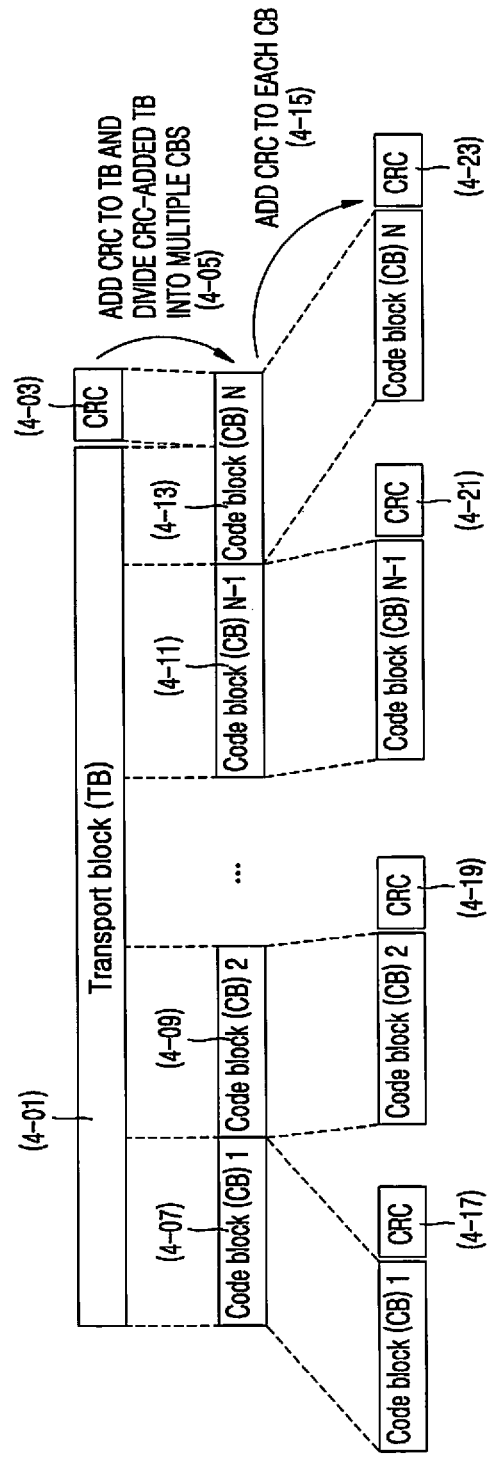
FIG. 4 illustrates a process in which one transport block is divided into several code blocks and a cyclic redundant check (CRC) is added, according to an embodiment.

FIG. 4 illustrates a process in which one transport block is divided into several code blocks and a CRC is added, according to an embodiment.

Referring to FIG. 4, a CRC 4-03 may be added to an end part or start part of a TB 4-01 to be transmitted in a UL or DL. The CRC may have 16 or 24 bits or a pre-fixed bit number, or may have a bit number variable with a channel condition, and may be used to determine a channel coding success. The TB 4-01 and the CRC-added part may be divided into several CBs 4-07, 4-09, 4-11, and 4-13. The group of CBs are indicated by 4-05. A maximum size for the CB may be previously defined, and in this case, the last CB 4-13 may be smaller in size than the other CBs or may be padded with 0, a random value, or 1 to have the same length as the other CBs. To each of the CBs 4-07, 4-09, 4-11, and 4-13, CRCs 4-17, 4-19, 4-21, and 4-23 may be added, as indicated by 4-15. The CRC may have 16 or 24 bits or a pre-fixed bit number, and may be used to determine a channel coding success.

The TB 4-01 and a cyclic generator polynomial may be used to generate the CRC 4-03, and the cyclic generator polynomial may be defined in various manners. For example, assuming that a cyclic generator polynomial for a 24-bit CRC is $g_{CRC24A}(D)=D^{24}+D^{23}+D^{18}\pm D^{17}+D^{14}+D^{11}+D^{10}+D^7+D^6+D^5+D^4+D^3+1$ and L=24, then for TB data $a_0, a_1, a_2, a_3, \ldots, a_{A-1}$, the CRC $p_0, p_1, p_2, p_3, \ldots, p_{A-1}$ may be determined to be a value having a remainder of 0 after dividing $a_0 D^{A+23}, a_1 D^{A+22}, \ldots, a_{A-1} D^{24}, p_0 D^{23}, p_1 D^{22}, \ldots, p_{22} D^1, p_{23}$ by $g_{CRC24A}(D)$.

Meanwhile, the above description has been made by taking a CRC length L of 24 as an example, but this is merely an example. The CRC length L may be determined to be various lengths such as 12, 16, 24, 32, 40, 48, or 64. After the CRC is added to the TB in the foregoing manner, they may be divided into N CBs 4-07, 4-09, 4-11, and 4-13. The CRCs 4-17, 4-19, 4-21, and 4-23 may be added to each of the CBs 4-07, 4-09, 4-11, and 4-13, as indicated by 4-15. To generate the CRC added to the CB, a CRC having a length that is different from or a cyclic generator polynomial that is different from one used to generate the CRC is added to the TB. However, the CRC 4-03 added to the TB 4-01 and the CRCs 4-17, 4-19, 4-21, and 4-23 added to the CBs 4-07, 4-09, 4-11, and 4-13 may be omitted according to a type of a channel code to be applied to a corresponding CB. For example, when a low-density parity check (LDPC) code, instead of a turbo code, is applied to a CB, the CRCs 4-17, 4-19, 4-21, and 4-23 to be inserted to the respective CBs 4-07, 4-09, 4-11, and 4-13 may be omitted. However, even when LDPC is applied, the CRCs 4-17, 4-19, 4-21, and 4-23 may be added to the respective CBs 4-07, 4-09, 4-11, and 4-13. In addition, when a polar code is used, a CRC may be added or omitted.

As illustrated in FIG. 4, a maximum length of a CB may be determined according to a type of channel coding to be applied, and a TB to be transmitted and a CRC added to the TB may be divided into CBs based on the maximum length of the CB. In an existing LTE system, a CB-specific CRC is added to a CB, and data bits of the CB and the CRC are encoded into a channel code to determine coded bits, in which for the respective coded bits, a previously agreed-upon rate-matching bit number is determined.

The BS is an entity that performs resource assignment of the terminal, and may be at least one of a gNode B (gNB), an eNode B (eNB), a Node B, a wireless access unit, a BS controller, or a node on a network. The terminal may include UE, a mobile station (MS), a cellular phone, a smartphone, a computer, or a multimedia system capable of performing communication functions.

A DL may be a wireless transmission path of a signal for transmission from the BS to the UE, and a UL may mean a wireless transmission path of a signal for transmission from the UE to the BS. While embodiments of the disclosure are described by using an NR system as an example, the disclosure may also be applied to other communication systems having a similar technical background or channel form. Also, the disclosure may also be applied to other communication systems through some modifications within a range that does not largely depart from the scope of the disclosure based on the knowledge of one of ordinary skill in the art.

Conventional physical channels and signals may be used interchangeably with data or control signals. For example, a physical downlink shared channel (PDSCH) is a physical channel for transmitting data, but in the disclosure, a PDSCH may be used as data.

High-layer signaling is a method of delivering a signal from a BS to a UE by using a DL data channel of a physical layer or from the UE to the BS by using a UL data channel of the physical layer, and may be mentioned as RRC signaling or a MAC CE.

In current LTE and NR, the UE may attempt decoding for TB reception in a physical layer. When any one TB succeeds in decoding, the UE may deliver an ACK to an upper layer thereof; when the TB fails in decoding, the UE may deliver a NACK to the upper layer thereof. To transmit ACK or NACK information back to a transmission end, the UE may deliver ACK/NACK information from the upper layer to a physical layer to form feedback information and a signal.

The UE may include a reception apparatus operating with hardware and a reception apparatus operating with software. The UE may store reception data and a decoding result, i.e., ACK/NACK information in a software entity. When the UE transmits ACK/NACK information as feedback, the UE may prepare for transmission by retrieving ACK/NACK information stored in the software entity to a hardware entity, during which much processing time is consumed.

Thus, the disclosure provides a method and apparatus in which the UE stores an ACK/NACK in the hardware entity and feeds back the same. Meanwhile, when the UE attempts TB decoding in DL data transmission, the UE may determine transmission success and failure by performing decoding for each CB. When the UE fails in decoding with respect to one CB or TB, the UE may store a log likelihood ratio (LLR) value for performing decoding or similar information in a soft buffer. When a corresponding TB is retransmitted, the stored LLR value may be combined with retransmitted data for use in decoding. In such implementation, when the data for retransmission of the TB is received, the data needs to be combined with the LLR value stored in the soft buffer and decoding with respect to all CBs needs to be performed again. That is, even for a CB succeeding in initial transmission, decoding has to be newly performed. This lengthens a processing time in retransmission. Therefore, the disclosure provides a method and apparatus in which information bits of a succeeding CB are stored to prevent a processing time from increasing even in retransmission.

Figure 5:
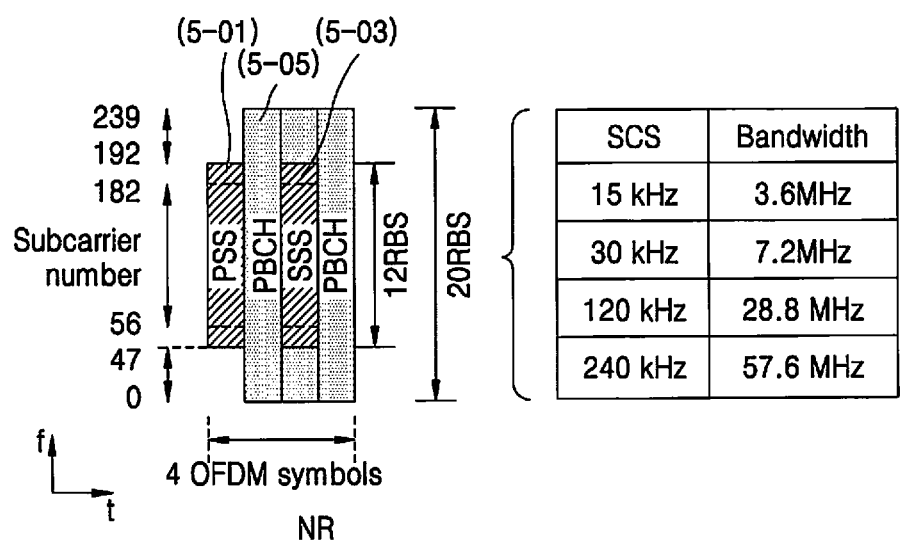
FIG. 5 illustrates a state in which synchronization signals and a physical broadcast channel (PBCH) are mapped in frequency and time domains in a $3^{rd}$-generation partnership project (3GPP) NR system.

FIG. 5 illustrates a state in which synchronization signals and a PBCH are mapped in frequency and time domains in a 3GPP NR system, according to an embodiment. A primary synchronization signal (PSS) 5-01, a secondary synchronization signal (SSS) 5-03, and a PBCH 5-05 are mapped to four OFDM symbols, in which the PSS 5-01 and the SSS 5-03 are mapped to twelve RBs and the PBCH 5-05 is mapped to twenty RBs. FIG. 5 shows a table providing information for how a frequency band of twenty RBs changes according to subcarrier spacing (SCS). A resource region in which the PSS, the SSS, and the PBCH are transmitted may be referred to as an SS/PBCH block.

Figure 6:
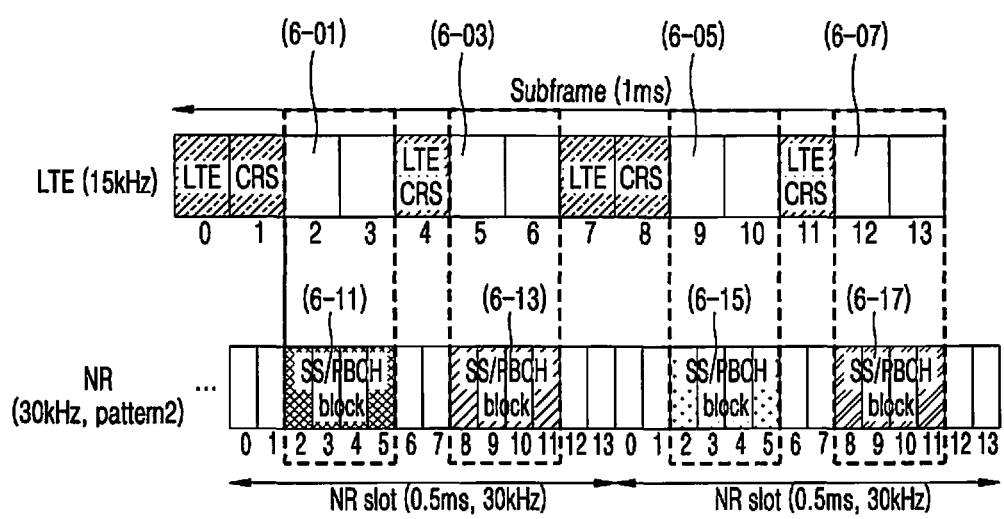
FIG. 6 is a diagram describing symbols in which one synchronization signal (SS)/PBCH block is mapped in a slot, according to an embodiment.

FIG. 6 is a diagram describing symbols in which one SS/PBCH block is mapped in a slot, according to an embodiment.

When comparing an LTE system using SS of 15 kilohertz (kHz) with an NR system using SS of 30 kHz, SS/PBCH blocks 6-11, 6-13, 6-15, and 6-17 of the NR system may be transmitted at positions 6-01, 6-03, 6-05, and 6-07 at which cell-specific reference signals (CRSs) transmitted at all times in the LTE system may be avoided. This is intended to allow co-existence of the LTE system and the NR system in one frequency band.

Figure 7:
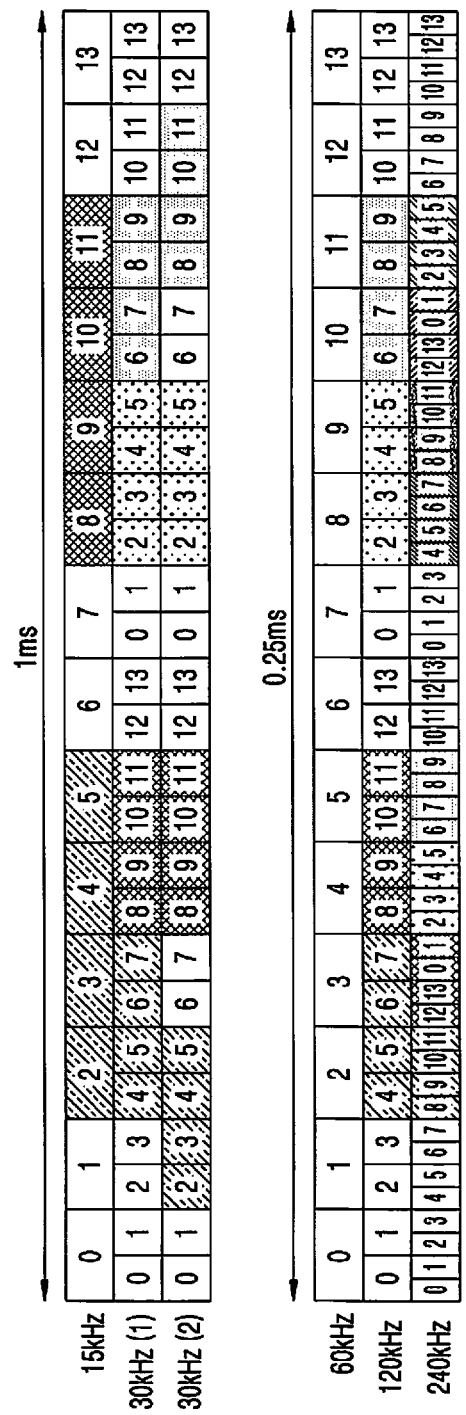
FIG. 7 is a diagram describing symbols among symbols within 1 ms in which an SS/PBCH block is transmittable, according to an embodiment.
Figure 8:
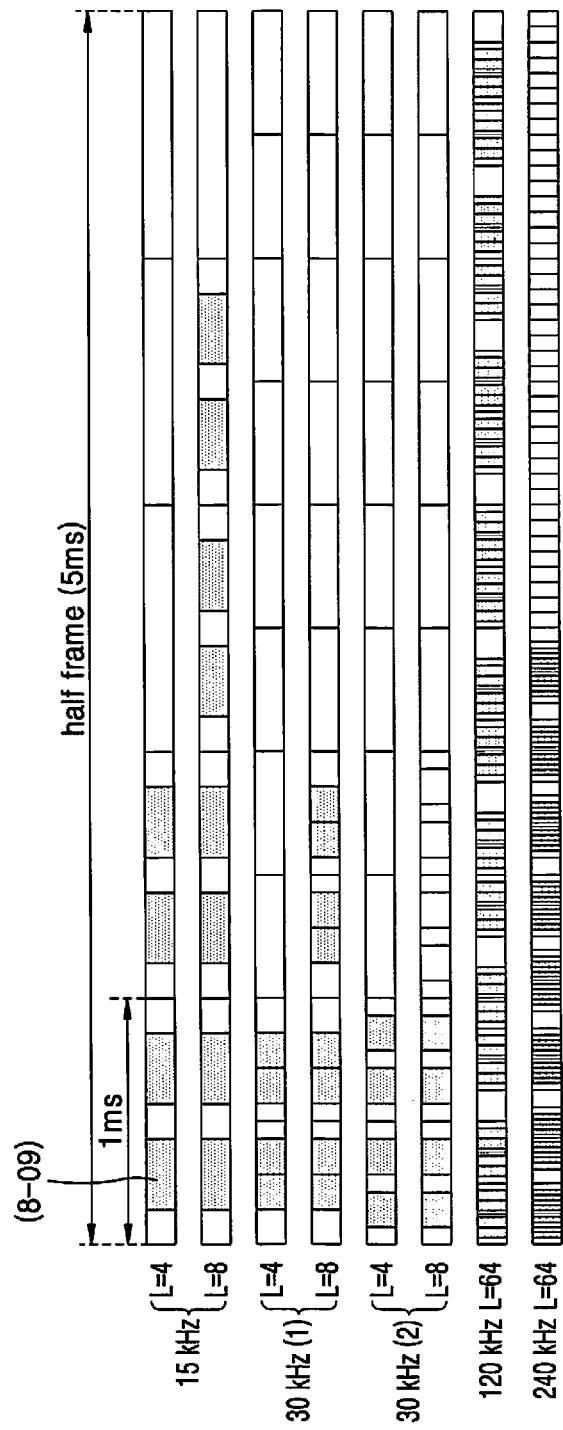
FIG. 8 is a diagram describing a slot and symbols among slots and symbols within 5 ms in which an SS/PBCH block is transmittable, according to an embodiment.

FIG. 7 is a diagram describing symbols within 1 ms in which an SS/PBCH block is transmittable, with respect to SS, according to an embodiment. FIG. 8 is a diagram describing a slot and symbols among slots and symbols within 5 ms in which an SS/PBCH block is transmittable, with respect to SS, according to an embodiment. In a region where an SS/PBCH block is transmittable, the SS/PBCH block does not need to be transmitted at all times, and the SS/PBCH block may be transmitted or may not be transmitted according to selection of a BS.

Reception data and a decoding result, i.e., HARQ-ACK information, may be stored in a hardware entity and the stored HARQ-ACK information may be fed back.

Figure 9:
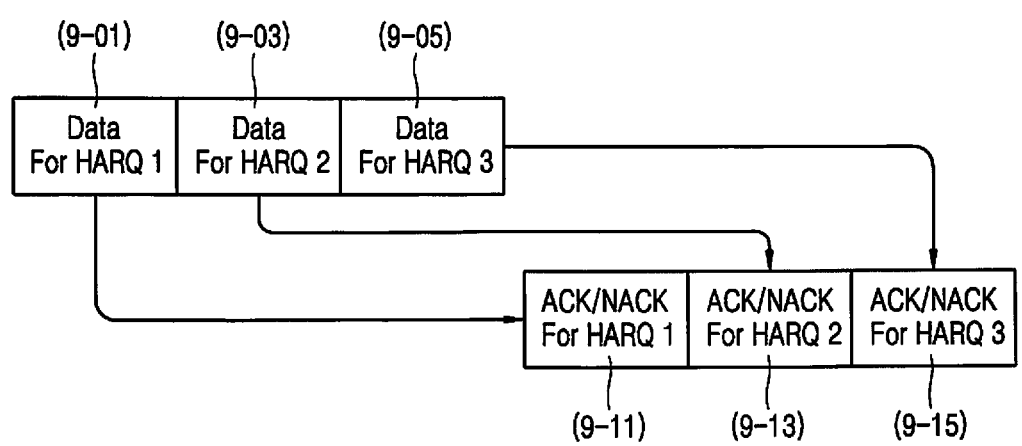
FIG. 9 is a diagram describing a method of transmitting data and transmitting HARQ-acknowledgement (ACK) feedback information corresponding to the data in an LTE or NR system, according to an embodiment.

FIG. 9 is a diagram describing a method of transmitting data and transmitting HARQ-ACK feedback information corresponding to the data in an LTE or NR system, according to an embodiment.

Referring to FIG. 9, data 9-01, 9-03, and 9-05 corresponding to HARQ processes 1, 2, and 3 may be respectively transmitted, and HARQ-ACK information 9-11, 9-13, and 9-15 corresponding to the respective data 9-01, 9-03, and 9-05 may be fed back. A minimum processing time for transmitting corresponding HARQ-ACK information after receiving data by the UE is fixed, such that the UE has to feed back the HARQ-ACK information as fast as a corresponding minimum processing time.

Figure 10:
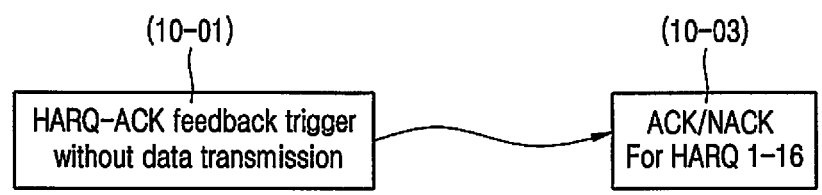
FIG. 10 is a diagram describing a method, performed by a user equipment (UE), of feeding back HARQ-ACK information about data currently processed by a UE in a HARQ process, by transmitting control information without transmitting data, according to an embodiment.

FIG. 10 is a diagram describing a method, performed by a UE, of feeding back HARQ-ACK information about data currently processed by a UE in a HARQ process, simply by transmitting control information without transmitting data, according to an embodiment.

Referring to FIG. 10, the BS may transmit to the UE, control information indicating that HARQ-ACK information regarding data needs to be fed back or a TB being processed in a current HARQ process needs to be fed back 10-01.

The UE having received the control information may feed back the HARQ-ACK information regarding data being kept or processed in current HARQ processes to the BS 10-03. For example, when 16 HARQ processes are configured for the UE for DL data transmission, the UE may feed back 16-bit or 32-bit HARQ-ACK information to the BS based on a configuration.

Figure 11:
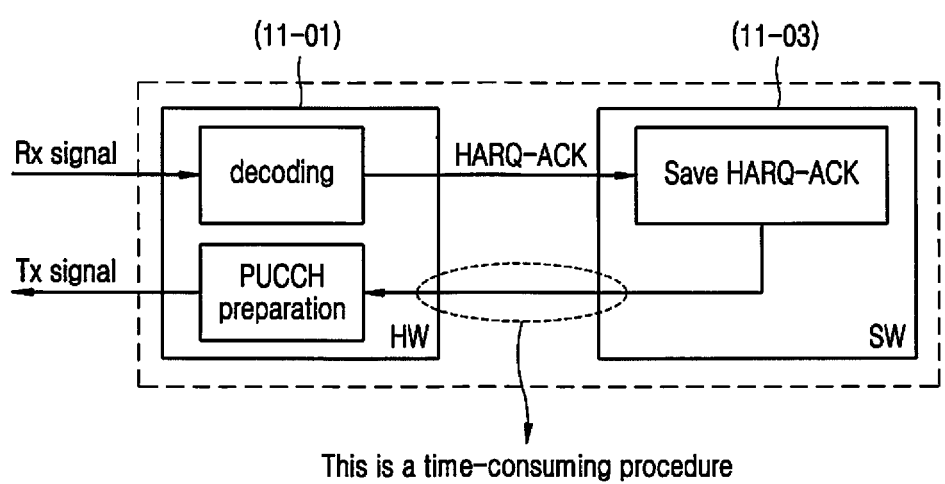
FIG. 11 is a diagram describing a structure of a UE for receiving and processing DL data, according to an embodiment.

FIG. 11 is a diagram describing a structure of a UE for receiving and processing DL data, according to an embodiment.

Referring to FIG. 11, the UE may roughly include a hardware entity 11-01 and a software entity 11-03. Division into the hardware entity 11-01 and the software entity 11-03 may be made by different blocks or different implementations. The UE may perform signal reception and processing in the hardware entity 11-01, store HARQ-ACK feedback information that is reception success or failure information after performing processing, and deliver the stored feedback information to an upper layer. Thereafter, in an operation where the UE feeds back the HARQ-ACK information, the UE may read the HARQ-ACK information stored in the software entity into the hardware entity, and generate and transmit a UL signal based on the HARQ-ACK information. Meanwhile, a time for the UE to read the HARQ-ACK information stored in the software entity into the hardware entity is required, increasing a delay time.

To solve the aforementioned delay issue, the operation of the embodiment presented in FIG. 12 will be described.

Figure 12:
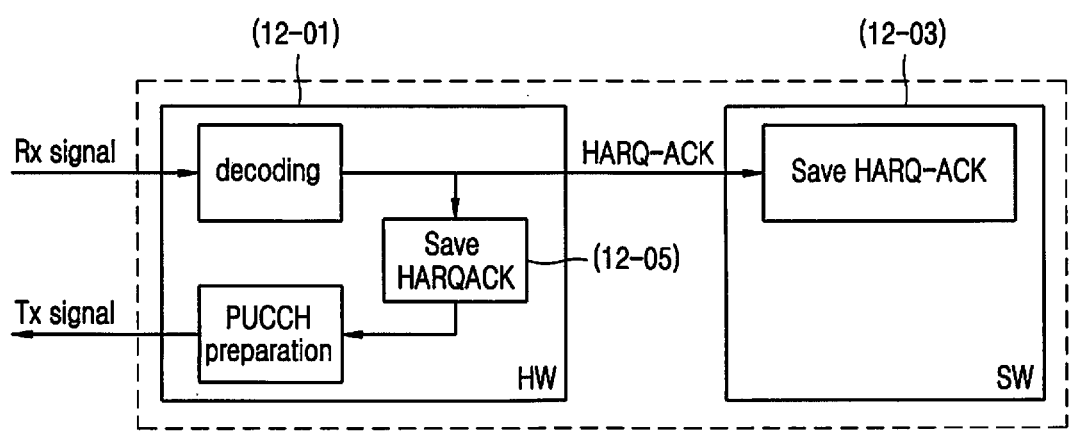
FIG. 12 is a diagram describing a structure of a UE for receiving and processing DL data, according to an embodiment.

FIG. 12 is a diagram describing a structure of a UE for receiving and processing DL data, according to an embodiment.

Referring to FIG. 12, a receiving UE includes not only a HARQ-ACK storage space of a software entity 12-03 for delivering HARQ-ACK information that is a decoding result with respect to reception data to an upper layer of the UE, but also a buffer 12-05 for storing the HARQ-ACK information in a hardware entity 12-01. The buffer 12-05 for storing the HARQ-ACK information in the hardware entity 12-01 may store HARQ-ACK information that is a decoding result with respect to data corresponding to each HARQ process.

Figure 13:
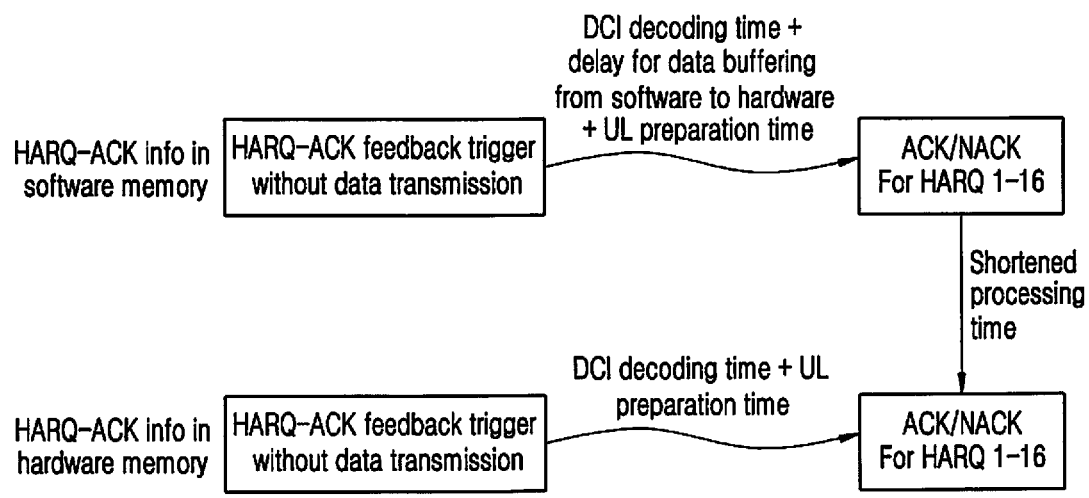
FIG. 13 is a diagram describing a method, performed by a UE, of reducing a HARQ processing time for feeding back HARQ-ACK, according to an embodiment.

FIG. 13 is a diagram describing a method, performed by a UE, of reducing a HARQ processing time for feeding back a HARQ-ACK, according to an embodiment.

As an example, when the UE receives an instruction for HARQ-ACK transmission for HARQ processes from the BS, the UE may transmit, using a UL control channel, the HARQ-ACK information that is stored in the buffer of the hardware entity to feed back the HARQ-ACK information. As illustrated in FIG. 13, the UE does not perform an operation of reading HARQ-ACK information stored in the software entity for HARQ-ACK transmission into the hardware entity, thereby reducing a HARQ processing time for feeding back the HARQ-ACK information.

Descriptions will be made of an ACK/NACK transmission method for all HARQ processes of the UE through a BS configuration.

The receiving UE may store all HARQ processes or HARQ-ACK information for configured HARQ-ACK processes in the buffer 12-05 of the hardware entity 12-01. Thereafter, the UE may prepare for transmission of a UL control channel for transmission of all stored HARQ-ACK information. For example, HARQ-ACK information for HARQ process numbers 1 through 16 may be stored using a bit map, and a HARQ process number that has not been transmitted or is blank may be set to a default value (NACK or ACK). The UE may prepare for transmission of HARQ-ACK information for all HARQ processes or a configured HARQ process at all times through a UL control channel, and newly update the HARQ-ACK information based on a decoding result with respect to reception data. Meanwhile, the BS may indicate HARQ-ACK information transmission for all HARQ process numbers stored in the UE by transmitting downlink control information (DCI) including a HARQ-ACK transmission indicator of 1 bit for all the HARQ process numbers, and the UE may transmit HARQ-ACK information for all the HARQ process numbers by using a prepared UL control channel.

Figure 14:
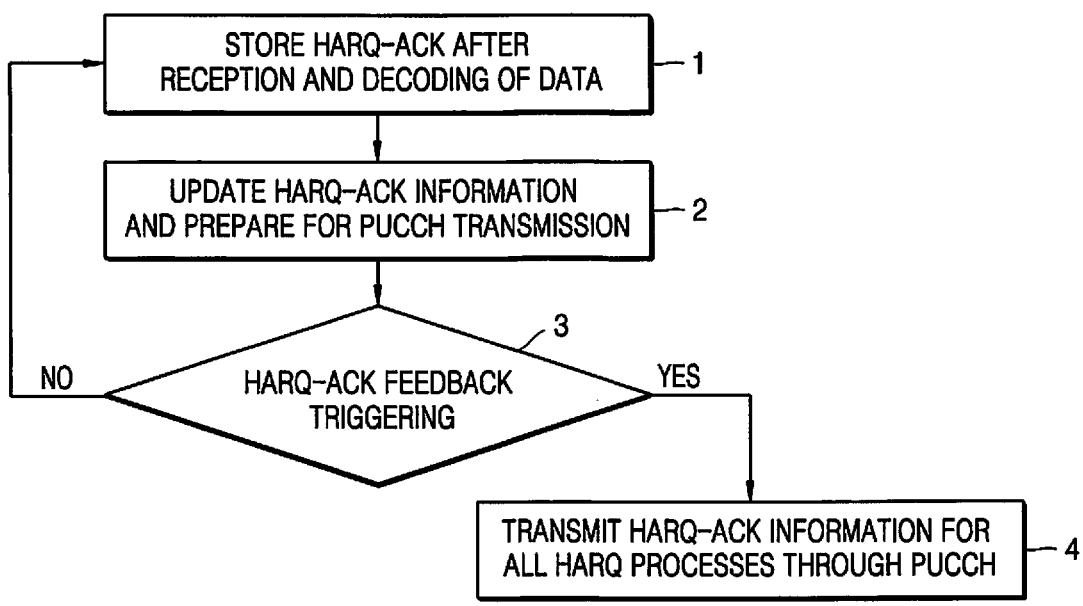
FIG. 14 is a flowchart illustrating a HARQ-ACK feedback operation of a UE, according to an embodiment.

FIG. 14 is a flowchart illustrating a HARQ-ACK feedback operation of a UE, according to an embodiment.

Referring to FIG. 14, the UE performs DL data reception and decoding and stores HARQ-ACK information in a buffer of a hardware entity in step 1. In step 2, the UE updates HARQ-ACK information corresponding to a HARQ process number to a bit map, and prepares for transmission of a UL control channel. When the UE receives a HARQ-ACK transmission indicator for all HARQ process numbers from the BS in step 3, the UE transmits a UL control channel including HARQ-ACK information regarding all the HARQ process numbers in step 4.

When the UE does not receive the indicator from the BS, the UE may receive subsequent DL data and then perform a corresponding operation again. The foregoing operations may be performed each time when data is received, to update HARQ-ACK transmission preparation.

When UL transmission is made from the UE to the BS through an unlicensed band, the UE may perform a channel access procedure or listen-before talk (LBT). The UE may access the unlicensed band when the unlicensed band is determined to be in an idle state as a result of performing the channel access procedure, and perform configured signal transmission. A system and device for transmitting and receiving a signal by using the unlicensed band has limited channel access, such that HARQ-ACK transmission for all the HARQ process numbers may be used. When the foregoing disclosure is applied to the UE using the unlicensed band, an operation of reading HARQ-ACK information from the software entity into the hardware entity may not be performed, thus reducing an HARQ processing time.

A method will be described in which the UE stores information bits of a CB succeeding in decoding an initial transmission and does not perform decoding for a retransmission.

Figure 15:
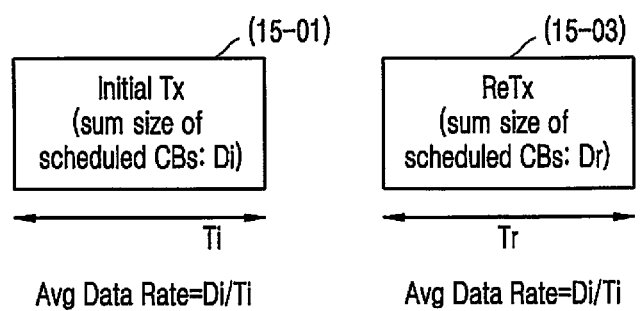
FIG. 15 is a diagram describing a data rate in initial transmission and re-transmission, according to an embodiment.

FIG. 15 is a diagram for describing a data rate in initial transmission and re-transmission, according to an embodiment.

An NR system supports partial retransmission in the unit of a CB group, and considering this point, as illustrated in FIG. 15, an average or instant data rate in initial transmission and retransmission may be calculated by dividing a sum of bit numbers included in CBs actually transmitted or a sum of CB sizes by a transmission length. More specifically, as indicated by 15-01, in initial transmission, data is transmitted in a terabyte (TB) size of Di during a slot of Ti, such that an average data rate may be calculated as Di/Ti. However, as indicated by 15-03, in retransmission, partial retransmission may be performed for a CB failing in initial transmission, such that a sum of CBs to be transmitted may have a size of Dr (=Di) and for a transmission time Tr (=Ti), an average data rate may be calculated as Dr/Tr. Herein, the sum of sizes of CBs actually transmitted in a retransmission, Dr (=Di), and the transmission time Tr (=Ti) may be reduced compared to an initial transmission. For example, a slot of 14 symbols may be required to transmit X CBs in an initial transmission, but a slot of two symbols may be required to transmit Y (=X) CBs in a retransmission. Thus, when already succeeding CBs (i.e., successfully transmitted CBs) have to be decoded even though a small Dr and Tr are required for retransmission as partial retransmission of CBs, or when the UE uses an existing implementation, it is difficult to shorten a processing time.

Figure 16:
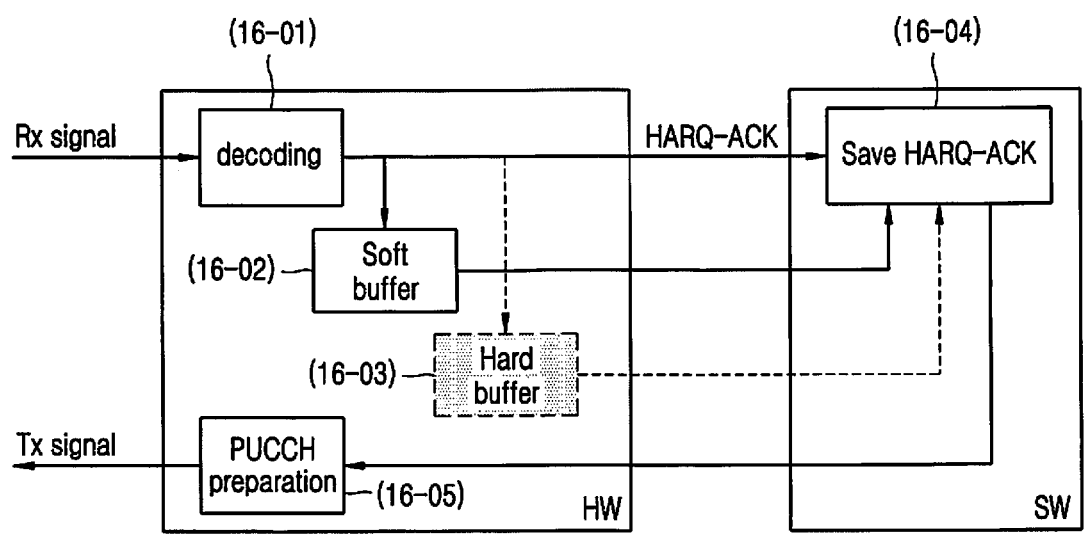
FIG. 16 is a diagram describing a HARQ feedback processing method of a UE, according to an embodiment.

FIG. 16 is a diagram describing a HARQ feedback processing method of a UE, according to an embodiment.

Referring to FIG. 16, an existing implementation method is indicated by a solid line and an implementation method proposed in the disclosure is expressed by a dotted line. In step 16-01, when the UE attempts TB decoding for a received signal, the UE determines transmission success or failure while performing decoding for each CB. When the UE fails in decoding with respect to one CB or TB, the UE stores an LLR value for performing decoding or similar information in a soft buffer, in step 16-02. When a corresponding TB is retransmitted, the stored LLR value may be combined with retransmitted data for use in decoding. In such an implementation, when the data for retransmission of the TB is received, the data needs to be combined with the LLR value stored in the soft buffer and decoding with respect to all CBs needs to be performed again. That is, even for a CB succeeding in initial transmission, decoding has to be newly performed.

As described above, a slot of 14 symbols may be required to transmit X CBs using a TB size of Di in initial transmission, but a slot of two symbols may be required to transmit Y (=X) CBs in retransmission. However, in retransmission, the UE has to perform decoding again for X CBs when processing Y (=X) CBs, such that the UE may store HARQ-ACK information in step 16-04 and the same time is needed to prepare for corresponding HARQ-ACK feedback transmission as in initial transmission in step 16-05. Thus, the disclosure provides a method and apparatus for preventing a retransmission processing time from increasing like in the case of initial transmission.

For example, a first method includes storing an information bit for a CB and a CRC bit succeeding in decoding.

Additionally or alternatively, a second method includes storing an information bit for a CB succeeding in decoding, without CRC.

The information bit for the CB succeeding in decoding may mean a hard information bit of 0 or 1 determined after decoding of soft information, i.e., an LLR value. A method proposed in the disclosure is indicated by a solid line in FIG. 16. More specifically, when the UE stores information about a CB succeeding in decoding in a hard buffer as in step 16-03 of FIG. 16, the UE does not need to additionally decode a CB succeeding in initial transmission, in a retransmission stage.

Meanwhile, the term "hard buffer" in step 16-03 may be replaced with another term. As in the foregoing example, a slot of 14 symbols may be required to transmit X CBs using a TB size of Di in initial transmission, but a slot of two symbols may be required to transmit Y (=X) CBs in retransmission. The UE according to the disclosure may perform decoding with respect to Y CBs in combination with an LLR value stored in a soft buffer during retransmission, and may not perform additional decoding with respect to (X-Y) CBs because decoding information for (X-Y) CBs is stored in the hard buffer. Thus, the UE may store HARQ-ACK information in step 16-04, and a time required for preparation for PUCCH transmission for the HARQ-ACK information in step 16-05 may be reduced when compared to initial transmission.

Figure 17:
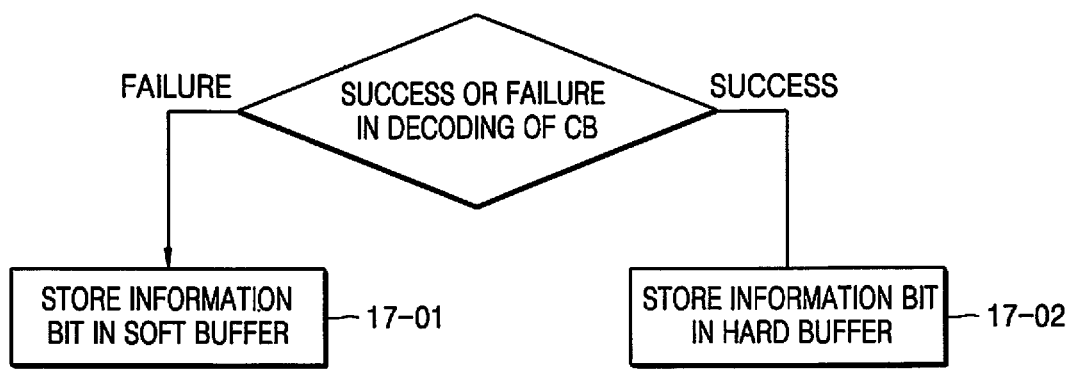
FIG. 17 is a diagram describing a method, performed by a UE, of storing an information bit in a buffer based on a code block (CB) decoding success or failure, according to an embodiment.

FIG. 17 is a diagram describing a method, performed by a UE, of storing an information bit in a buffer based on a CB decoding success or failure, according to an embodiment.

The storage space of a buffer may be minimized according to the method illustrated in FIG. 17. In the method, the UE may receive a TB and perform decoding for each CB, such that contents stored in the buffer may be determined according to whether transmission succeeds or fails. During decoding for each CB, an LLR value or similar information is stored in the soft buffer in step 17-01 for use in decoding during the next transmission for a CB failing in decoding. On the other hand, during decoding for each CB, the UE stores a decoding information bit in the hard buffer (as in the above-described first and second method) for a CB succeeding in decoding in step 17-02 to prevent decoding from being performed additionally during the next transmission.

Figure 18:
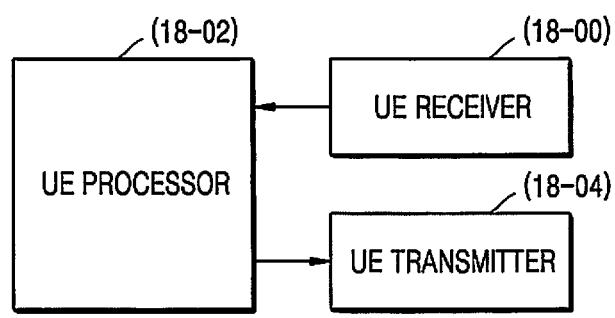
FIG. 18 is a block diagram of a UE, according to an embodiment.
Figure 19:
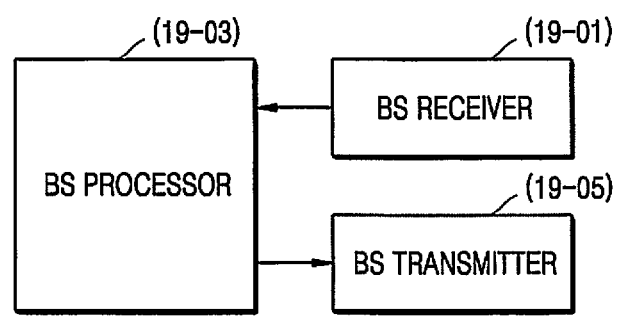
FIG. 19 is a block diagram of a BS, according to an embodiment.

A transmitter, a receiver, and a processor of each of the UE and the BS are illustrated in FIGS. 18 and 19. Transmission and reception methods of the BS and the UE are illustrated to perform the data decoding method and the HARQ-ACK feedback storage and transmission method in the above-described embodiments.

FIG. 18 is a block diagram of a UE, according to an embodiment.

As illustrated in FIG. 18, a UE includes a UE receiver 18-00, a UE transmitter 18-04, and a UE processor 18-02. The UE receiver 18-00 and the UE transmitter 18-04 are collectively referred to as a transceiver. The transceiver may transmit and receive a signal to and from the BS. The signal may include control information and data.

The transceiver may include an RF transmitter that up-converts and amplifies a frequency of a transmission signal and an RF signal that low-noise-amplifies a received signal and down-converts a frequency. The transceiver may receive a signal through a radio channel and output the received signal to the UE processor 18-02, and transmit a signal output from the UE processor 18-02 through the radio channel.

The UE processor 18-02 may control a series of processes such that the UE operates according to the above-described embodiment of the disclosure. For example, the UE processor 18-02 may control the UE receiver 18-00 to receive data and control information from the BS, and determine to process a TB included in the data based on the control information and store and transmit HARQ-ACK. Thereafter, the UE transmitter 18-04 may deliver feedback of the data to the BS.

FIG. 19 is a block diagram of a BS, according to an embodiment.

As illustrated in FIG. 19, a BS includes a BS receiver 19-01, a BS transmitter 19-05, and a BS processor 19-03. The BS receiver 19-01 and the BS transmitter 19-05 will be collectively referred to as a transceiver. The transceiver may transmit and receive a signal to and from the UE. The signal may include control information and data. To this end, the transceiver may include an RF transmitter that up-converts and amplifies a frequency of a transmission signal and an RF signal that low-noise-amplifies a received signal and down-converts a frequency. The transceiver may receive a signal through a radio channel and output the received signal to the BS processor 19-03, and transmit a signal output from the BS processor 19-03 through the radio channel.

The BS processor 19-03 may control a series of processes such that the BS operates according to the above-described embodiment of the disclosure. For example, the BS processor 19-03 may control transmission of a HARQ-ACK feedback. Thereafter, the BS transmitter 19-05 may transmit control information for transmitting a HARQ-ACK transmitted in the above-described method, and the BS receiver 19-01 may receive feedback with respect to the transmitted data from UEs.

According to the disclosure, a processing time in data reception may be shortened, and a feedback preparation time may also be reduced.

The embodiments of the disclosure may be practiced in combination and the disclosure may also be carried out in an LTE system or a 5G system.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents

What is claimed is:

1. A method performed by a terminal in a wireless communication system, the method comprising:
    receiving, from a base station, a configuration indicating a number N of hybrid automatic repeat request (HARQ) processes used for downlink transmissions;
    receiving downlink control information (DCI) format 1-1 including a 1-bit HARQ-acknowledgement (HARQ-ACK) feedback indication for all of the N HARQ processes indicated by the configuration;
    identifying HARQ-ACK information associated with all of the N HARQ processes indicated by the configuration, in response to receiving the DCI format 1-1, wherein a number of bits for the HARQ-ACK information is identified based on the N indicated by the configuration, and wherein HARQ-ACK information for a transport block (TB) for a HARQ process is set to a negative acknowledgement (NACK) in case that the HARQ-ACK information for the TB for the HARQ process is absent; and
    transmitting the HARQ-ACK information through a physical uplink control channel (PUCCH) to the base station,
    wherein, based on the DCI format 1-1 including the 1-bit HARQ-ACK feedback indication for all of the N HARO processes. the DCI format 1-1 requests the HARQ-ACK information associated with all of the N HARQ processes and does not schedule a data transmission.

2. The method of claim 1, wherein the number of bits for the HARQ-ACK information is defined based on xN by the configuration, and the x and the N are natural numbers.

3. The method of claim 2, wherein the x is 1 and the number of bits for the HARQ-ACK information is the N.

4. A method performed by a base station in a wireless communication system, the method comprising:
    transmitting, to a terminal, a configuration indicating a number N of hybrid automatic repeat request (HARQ) processes used for downlink transmissions;
    transmitting, to the terminal, downlink control information (DCI) format 1-1 including a 1-bit HARQ-acknowledgement (HARQ-ACK) feedback indication for all of the N HARQ processes indicated by the configuration; and
    receiving, from the terminal through a physical uplink control channel (PUCCH), HARQ-ACK information associated with all of the N HARQ processes indicated by the configuration, wherein a number of bits for the HARQ-ACK information is identified based on the N indicated by the configuration,
    wherein HARQ-ACK information for a transport block (TB) for a HARQ process is set to a negative acknowledgement (NACK) in case that the HARQ-ACK information for the TB for the HARQ process is absent, and
    wherein, based on the DCI format 1-1 including the 1-bit HARQ-ACK feedback indication for all of the N HARO processes, the DCI format 1-1 requests the HARQ-ACK information associated with all of the N HARQ processes withoutand does not schedule a data transmission.

5. The method of claim 4, wherein the number of bits for the HARQ-ACK information is defined based on xN by the configuration, and the x and the N are natural numbers.

6. The method of claim 5, wherein the x is 1 and the number of bits for the HARQ-ACK information is the N.

7. A terminal in a wireless communication system, the terminal comprising:
    a transceiver; and
    a processor configured to:
        control the transceiver to receive, from a base station, a configuration indicating a number N of hybrid automatic repeat request (HARQ) processes used for downlink transmissions,
        control the transceiver to receive downlink control information (DCI) format 1-1 including a 1-bit HARQ-acknowledgement (HARQ-ACK) feedback indication for all of the N HARQ processes indicated by the configuration,
        identify HARQ-ACK information associated with all of the N HARQ processes indicated by the configuration, in response to receiving the DCI format 1-1, wherein a number of bits for the HARQ-ACK information is identified based on the N indicated by the configuration, and wherein HARQ-ACK information for a transport block (TB) for a HARQ process is set to a negative acknowledgement (NACK) in case that the HARQ-ACK information for the TB for the HARQ process is absent, and
        control the transceiver to transmit the HARQ-ACK information through a physical uplink control channel (PUCCH) to the base station,
        wherein, based on the DCI format 1-1 including the 1-bit HARQ-ACK feedback indication for all of the N HARO processes, the DCI format 1-1 requests the HARQ-ACK information associated with all of the N HARQ processes and does not schedule a data transmission.

8. The terminal of claim 7, wherein the number of bits for the HARQ-ACK information is defined based on xN by the configuration, and the x and the N are natural numbers.

9. The terminal of claim 8, wherein the x is 1 and the number of bits for the HARQ-ACK information is the N.

10. A base station in a wireless communication system, the base station comprising:
    a transceiver; and
    a processor configured to:
        control the transceiver to transmit, to a terminal, a configuration indicating a number N of hybrid automatic repeat request (HARQ) processes used for downlink transmissions,
        control the transceiver to transmit downlink control information (DCI) format 1-1 including a 1-bit HARQ-acknowledgement (HARQ-ACK) feedback indication for all of the N HARQ processes indicated by the configuration, and control the transceiver to receive, from the terminal through a physical uplink control channel (PUCCH), HARQ-ACK information associated with all of the N HARQ processes indicated by the configuration, wherein a number of bits for the HARQ-ACK information is identified based on the N indicated by the configuration, wherein HARQ-ACK information for a transport block (TB) for a HARQ process is set to a negative acknowledgement (NACK) in case that the HARQ-ACK information for the TB for the HARQ process is absent, and wherein, based on the DCI format 1-1 including the 1-bit HARO-ACK feedback indication for all of the N HARO processes. the DCI format 1-1 requests the HARQ-ACK information associated with all of the N HARQ processes withoutand does not schedule a data transmission.

11. The base station of claim 10, wherein the number of bits for the HARQ-ACK information is defined based on xN by the configuration, and the x and the N are natural numbers.

12. The base station of claim 11, wherein the x is 1 and the number of bits for the HARQ-ACK information is the N.

13. The base station of claim 11, wherein the x is 2 and the number of bits for the HARQ-ACK information is 2N.

14. The method of claim 2, wherein the x is 2 and the number of bits for the HARQ-ACK information is 2N.

15. The method of claim 5, wherein the x is 2 and the number of bits for the HARQ-ACK information is 2N.

16. The terminal of claim 8, wherein the x is 2 and the number of bits for the HARQ-ACK information is 2N.

* * * * *